United States Patent
Betz et al.

(10) Patent No.: US 9,133,775 B2
(45) Date of Patent: *Sep. 15, 2015

(54) VALVETRAIN FAULT INDICATION SYSTEMS AND METHODS USING ENGINE MISFIRE

(76) Inventors: Brian E. Betz, Casco, MI (US); Hugh William Miller, Linden, MI (US)

(*) Notice: Subject to any disclaimer, the term of this patent is extended or adjusted under 35 U.S.C. 154(b) by 207 days.

This patent is subject to a terminal disclaimer.

(21) Appl. No.: 13/590,369

(22) Filed: Aug. 21, 2012

(65) Prior Publication Data

US 2014/0053809 A1 Feb. 27, 2014

(51) Int. Cl.
*F02D 13/02* (2006.01)
*F01L 35/00* (2006.01)
(Continued)

(52) U.S. Cl.
CPC .............. *F02D 13/02* (2013.01); *F01L 13/0031* (2013.01); *F01L 13/0036* (2013.01); *F01L 35/00* (2013.01); *F02D 13/00* (2013.01); *F02D 41/0002* (2013.01); *F02D 41/221* (2013.01); *F01L 2820/04* (2013.01);
(Continued)

(58) Field of Classification Search
CPC .................. F02D 2041/001; F02D 2200/1015; F02D 41/221; F02D 35/023; F02D 13/0207; F02D 13/0226; F02D 2041/1417; F02D 35/028; F02D 13/0203; F02D 13/023; F02D 13/0246; F02D 1/34; F01L 2800/11; F01L 2001/34496; F01L 2820/041; F01L 2820/045; F02P 5/045; G01M 15/11
USPC ............... 701/101, 102, 105, 115, 29.1, 29.2, 701/29.7, 29.8, 29.9, 30.1, 30.3, 30.5, 30.8, 701/30.9, 31.1, 31.2, 31.4; 123/406.12–406.14, 406.16–406.19, 123/406.26–406.27, 406.41; 73/114.72, 73/114.26
See application file for complete search history.

(56) References Cited

U.S. PATENT DOCUMENTS 3,923,021 A 12/1975 Stark
4,233,943 A 11/1980 Rogora et al.
(Continued)

FOREIGN PATENT DOCUMENTS

CN 1204003 A 1/1999
CN 101074634 A 11/2007
(Continued)

OTHER PUBLICATIONS

Tim Gilles; Automotive Service: Inspection, Maintenance, and Repair; Jun. 12, 2003; Delmar Learning; Second Edition; p. 560.*
(Continued)

*Primary Examiner* — Stephen K Cronin
*Assistant Examiner* — Susan E Scharpf

(57) ABSTRACT

A system for a vehicle includes a misfire indication module, a valve control module, and a fault indication module. The misfire indication module selectively indicates that misfire occurred within a cylinder of an engine. The valve control module controls lifting of a valve of a cylinder of the engine and, in response to the misfire indication module indicating that misfire occurred within the cylinder, transitions lifting of the valve from one of a low lift state and a high lift state to the other one of the low lift state and the high lift state. The fault indication module selectively indicates that a fault is present in a variable valve lift (VVL) mechanism of the cylinder based on whether the misfire indication module indicates that misfire occurred within the cylinder after the transition to the other one of the low lift state and the high lift state.

17 Claims, 5 Drawing Sheets

(51) Int. Cl.
 *F02D 13/00* (2006.01)
 *F02D 41/22* (2006.01)
 *F02D 41/00* (2006.01)
 *F01L 13/00* (2006.01)

(52) U.S. Cl.
 CPC .. *F02D 2041/001* (2013.01); *F02D 2200/1015* (2013.01); *Y02T 10/42* (2013.01)

(56) References Cited

U.S. PATENT DOCUMENTS

| | | | |
|---|---|---|---|
| 4,525,781 A | 6/1985 | Konomi et al. | |
| 4,587,938 A | 5/1986 | Kobayashi et al. | |
| 4,658,787 A | 4/1987 | Takizawa | |
| 4,691,677 A | 9/1987 | Hotate et al. | |
| 4,716,873 A | 1/1988 | Takaba et al. | |
| 4,730,587 A | 3/1988 | Norota et al. | |
| 4,760,825 A | 8/1988 | Morita | |
| 4,763,264 A | 8/1988 | Okuno et al. | |
| 4,788,942 A | 12/1988 | Pouring et al. | |
| 4,915,076 A | 4/1990 | Takizawa | |
| 4,919,096 A | 4/1990 | Manaka et al. | |
| 5,005,547 A | 4/1991 | Suga et al. | |
| 5,046,468 A | 9/1991 | Erhard | |
| 5,074,810 A | 12/1991 | Hobbs et al. | |
| 5,107,813 A | 4/1992 | Inoue et al. | |
| 5,110,310 A | 5/1992 | Hobbs | |
| 5,229,945 A | 7/1993 | Demizu et al. | |
| 5,408,863 A | 4/1995 | Sawyers et al. | |
| 5,477,826 A | 12/1995 | Hara et al. | |
| 5,632,247 A | 5/1997 | Hashizume et al. | |
| 5,699,253 A | 12/1997 | Puskorius et al. | |
| 5,700,171 A | 12/1997 | Horton | |
| 5,715,794 A | 2/1998 | Nakamura et al. | |
| 5,732,382 A | 3/1998 | Puskorius et al. | |
| 5,751,147 A | 5/1998 | Nakata et al. | |
| 5,765,528 A | 6/1998 | Kamimaru | |
| 5,771,482 A | 6/1998 | Rizzoni | |
| 5,905,193 A | 5/1999 | Hashizume et al. | |
| 6,023,651 A * | 2/2000 | Nakayama et al. | 701/110 |
| 6,085,143 A | 7/2000 | Przymusinski et al. | |
| 6,109,986 A | 8/2000 | Gaynor et al. | |
| 6,415,656 B1 * | 7/2002 | Bidner et al. | 73/114.15 |
| 6,485,341 B1 | 11/2002 | Lanyi et al. | |
| 6,668,812 B2 | 12/2003 | Javaherian | |
| 6,672,282 B2 | 1/2004 | Harrison et al. | |
| 6,691,653 B2 | 2/2004 | Denz | |
| 6,752,009 B2 | 6/2004 | Minich et al. | |
| 6,757,606 B1 | 6/2004 | Gonring | |
| 6,758,179 B1 | 7/2004 | McKay et al. | |
| 6,866,024 B2 | 3/2005 | Rizzoni et al. | |
| 6,999,868 B2 * | 2/2006 | Funke et al. | 701/114 |
| 7,024,304 B2 | 4/2006 | Fukasawa et al. | |
| 7,047,125 B1 | 5/2006 | He et al. | |
| 7,047,924 B1 | 5/2006 | Waters et al. | |
| 7,063,057 B1 | 6/2006 | Waters et al. | |
| 7,117,080 B2 | 10/2006 | Sobel | |
| 7,133,766 B2 | 11/2006 | Kokubo | |
| 7,146,851 B2 | 12/2006 | Wakahara et al. | |
| 7,167,789 B1 | 1/2007 | Froloff et al. | |
| 7,178,503 B1 | 2/2007 | Brehob | |
| 7,197,916 B2 | 4/2007 | Matsumoto et al. | |
| 7,214,110 B1 | 5/2007 | Ehlers et al. | |
| 7,243,532 B2 * | 7/2007 | Tsujimura et al. | 73/114.02 |
| 7,246,583 B2 * | 7/2007 | Cinpinski et al. | 123/90.27 |
| 7,251,557 B2 | 7/2007 | Strom et al. | |
| 7,325,446 B1 | 2/2008 | Assaf et al. | |
| 7,353,803 B2 | 4/2008 | Mathews et al. | |
| 7,361,067 B1 | 4/2008 | Smedema | |
| 7,437,233 B2 | 10/2008 | Yasui et al. | |
| 7,444,236 B2 | 10/2008 | Wiles | |
| 7,451,739 B2 | 11/2008 | Yasui et al. | |
| 7,469,678 B2 | 12/2008 | Ruiz | |
| 7,500,470 B2 | 3/2009 | Buslepp et al. | |
| 7,526,943 B2 | 5/2009 | Cubr et al. | |
| 7,530,261 B2 | 5/2009 | Walters | |
| 7,607,415 B2 | 10/2009 | Mathews et al. | |
| 7,623,955 B1 * | 11/2009 | Rackmil et al. | 701/115 |
| 7,654,248 B2 | 2/2010 | Buslepp et al. | |
| 7,665,558 B2 | 2/2010 | Akimoto et al. | |
| 7,685,996 B2 | 3/2010 | Brehob | |
| 7,698,935 B2 | 4/2010 | Dibble et al. | |
| 7,784,443 B2 | 8/2010 | Hitomi et al. | |
| 7,861,689 B2 | 1/2011 | Haug et al. | |
| 7,877,174 B2 | 1/2011 | Walser et al. | |
| 7,918,212 B2 | 4/2011 | Verdejo et al. | |
| 8,027,782 B2 | 9/2011 | Assaf et al. | |
| 8,176,896 B2 | 5/2012 | Verdejo et al. | |
| 8,245,692 B2 | 8/2012 | Glugla et al. | |
| 8,251,043 B2 | 8/2012 | Smith | |
| 8,261,603 B2 | 9/2012 | Kondo et al. | |
| 8,307,808 B2 | 11/2012 | Kaiser et al. | |
| 8,387,384 B2 | 3/2013 | Quigley et al. | |
| 8,392,096 B2 | 3/2013 | Mathews et al. | |
| 8,478,511 B2 | 7/2013 | Hamama et al. | |
| 8,532,908 B2 | 9/2013 | Morgan et al. | |
| 8,612,124 B2 | 12/2013 | Verdejo et al. | |
| 2002/0157639 A1 | 10/2002 | Kidokoro et al. | |
| 2004/0153286 A1 | 8/2004 | Yamada | |
| 2004/0236496 A1 | 11/2004 | Sobel | |
| 2005/0039721 A1 | 2/2005 | Truscott et al. | |
| 2005/0056240 A1 | 3/2005 | Sugiyama et al. | |
| 2005/0121005 A1 | 6/2005 | Edwards | |
| 2005/0204805 A1 * | 9/2005 | Wakahara et al. | 73/118.1 |
| 2006/0112933 A1 | 6/2006 | Yasui et al. | |
| 2006/0124107 A1 | 6/2006 | Sauler et al. | |
| 2006/0241848 A1 * | 10/2006 | Strom et al. | 701/105 |
| 2006/0254560 A1 | 11/2006 | Mann et al. | |
| 2006/0293827 A1 | 12/2006 | Frauenkron et al. | |
| 2007/0068474 A1 | 3/2007 | Cinpinski et al. | |
| 2007/0119391 A1 | 5/2007 | Fried et al. | |
| 2007/0233430 A1 | 10/2007 | Singh | |
| 2007/0239343 A1 * | 10/2007 | Okubo et al. | 701/105 |
| 2007/0295290 A1 | 12/2007 | Cao | |
| 2008/0006244 A1 | 1/2008 | Asano et al. | |
| 2008/0028387 A1 | 1/2008 | Nakagawa et al. | |
| 2008/0077307 A1 | 3/2008 | Wiles | |
| 2008/0178844 A1 | 7/2008 | Naegele et al. | |
| 2008/0183367 A1 | 7/2008 | Kapus et al. | |
| 2008/0283025 A1 | 11/2008 | Sato | |
| 2008/0312810 A1 | 12/2008 | Nonoyama | |
| 2009/0048729 A1 | 2/2009 | Waters et al. | |
| 2009/0090106 A1 | 4/2009 | Muller | |
| 2009/0192693 A1 * | 7/2009 | Bottcher et al. | 701/102 |
| 2009/0215331 A1 | 8/2009 | Suzuki et al. | |
| 2009/0223495 A1 | 9/2009 | Ohata et al. | |
| 2009/0229568 A1 | 9/2009 | Nakagawa | |
| 2009/0276142 A1 | 11/2009 | Leone et al. | |
| 2009/0276143 A1 | 11/2009 | Rackmil et al. | |
| 2009/0276147 A1 | 11/2009 | Hamama et al. | |
| 2010/0012079 A1 | 1/2010 | Nakazono et al. | |
| 2010/0037859 A1 | 2/2010 | Mashiki | |
| 2010/0063712 A1 | 3/2010 | Bromberg et al. | |
| 2010/0083936 A1 | 4/2010 | Verdejo et al. | |
| 2010/0088010 A1 * | 4/2010 | Verdejo et al. | 701/105 |
| 2010/0089361 A1 | 4/2010 | Inada et al. | |
| 2010/0094528 A1 | 4/2010 | Auclair et al. | |
| 2010/0152990 A1 | 6/2010 | Bjernetun et al. | |
| 2010/0152991 A1 | 6/2010 | Suzuki | |
| 2010/0192905 A1 | 8/2010 | Lewis et al. | |
| 2010/0294027 A1 * | 11/2010 | Kondo et al. | 73/114.02 |
| 2011/0067396 A1 | 3/2011 | Quigley et al. | |
| 2011/0088468 A1 | 4/2011 | Mayhew | |
| 2011/0139072 A1 | 6/2011 | Rollinger et al. | |
| 2011/0224882 A1 * | 9/2011 | Makino et al. | 701/102 |
| 2011/0246049 A1 | 10/2011 | Matsuo et al. | |
| 2011/0253100 A1 | 10/2011 | Kaiser et al. | |
| 2011/0265761 A1 | 11/2011 | Amann et al. | |
| 2011/0283972 A1 | 11/2011 | Wermuth et al. | |
| 2012/0048234 A1 | 3/2012 | Hamama et al. | |
| 2012/0078485 A1 | 3/2012 | Verdejo et al. | |

(56) References Cited

U.S. PATENT DOCUMENTS

| | | |
|---|---|---|
| 2012/0191275 A1 | 7/2012 | Clever et al. |
| 2012/0191276 A1 | 7/2012 | Clever et al. |
| 2012/0191277 A1 | 7/2012 | Clever et al. |
| 2012/0209494 A1* | 8/2012 | Verdejo et al. ............ 701/102 |
| 2013/0047956 A1 | 2/2013 | Davis |
| 2013/0054109 A1 | 2/2013 | Buslepp et al. |

FOREIGN PATENT DOCUMENTS

| | | | |
|---|---|---|---|
| CN | 101331305 A | 12/2008 | |
| DE | 102007024415 B3 | 1/2009 | |
| DE | 102009008247 B3 | 8/2010 | |
| JP | 2009174397 A | 8/2009 | |
| JP | 2009275663 A | 11/2009 | |
| JP | 2011012607 A | 1/2011 | |

OTHER PUBLICATIONS

O'Reilly Auto Parts; Possible Causes of Engine Misfire; http://www.oreillyauto.com/site/app/newsfeed/detail?article=800649141; Nov. 23, 2011.*
U.S. Appl. No. 13/024,726, Julian R. Verdejo et al., filed Feb. 10, 2011.
U.S. Appl. No. 13/590,351, Brian E. Betz et al., filed Aug. 21, 2012.
U.S. Appl. No. 13/775,628, filed Feb. 25, 2013, Gwidt et al.
U.S. Appl. No. 12/357,776, Verdejo et al.
U.S. Appl. No. 12/478,159, Verdejo et al.
U.S. Appl. No. 12/762,516, Kaiser et al.
U.S. Appl. No. 12/762,523, Mathews et al.
U.S. Appl. No. 12/984,818, Verdejo et al.
U.S. Appl. No. 13/118,985, Morgan et al.

* cited by examiner

VALVETRAIN FAULT INDICATION SYSTEMS AND METHODS USING ENGINE MISFIRE

CROSS-REFERENCE TO RELATED APPLICATIONS

This application is related to U.S. patent application Ser. No. 13/590,351 filed on Aug. 21, 2012. The disclosure of the above related application is incorporated herein by reference in its entirety.

FIELD

The present disclosure relates to internal combustion engines and more particularly to systems and methods for identifying faults in a valvetrain.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include an internal combustion engine that generates drive torque. An intake valve is selectively opened to draw air into a cylinder of the engine. The air mixes with fuel to form an air/fuel mixture. The air/fuel mixture is combusted within the cylinder. An exhaust valve is selectively opened to allow the exhaust gas resulting from combustion to exit the cylinder.

One or more rotating camshafts regulate the opening and closing of the intake and/or exhaust valves. The camshafts include cam lobes that are fixed to and rotate with the camshafts. The geometric profile of a cam lobe determines a valve opening schedule. More specifically, the geometric profile of a cam lobe generally controls the period that the valve is open (duration) and the amount or distance (lift) that the valve opens.

Variable valve actuation (VVA) and variable valve lift (VVL) improve fuel economy, engine efficiency, and/or performance by modifying valve duration and lift, respectively, as a function of engine operating conditions. Two-step VVL systems include VVL mechanisms, such as hydraulically-controlled, switchable roller finger followers (SRFFs). A SRFF associated with a valve (e.g., the intake or exhaust valves) allows the valve to be lifted in two discrete states: a low lift state and a high lift state. The valve lift associated with the high lift state is greater than the valve lift associated with the low lift state.

SUMMARY

A system for a vehicle includes a misfire indication module, a valve control module, and a fault indication module. The misfire indication module selectively indicates that misfire occurred within a cylinder of an engine. The valve control module controls lifting of a valve of a cylinder of the engine and, in response to the misfire indication module indicating that misfire occurred within the cylinder, transitions lifting of the valve from one of a low lift state and a high lift state to the other one of the low lift state and the high lift state. The fault indication module selectively indicates that a fault is present in a variable valve lift (VVL) mechanism of the cylinder based on whether the misfire indication module indicates that misfire occurred within the cylinder after the transition to the other one of the low lift state and the high lift state.

A method for a vehicle includes: selectively indicating that misfire occurred within a cylinder of an engine; and controlling lifting of a valve of a cylinder of the engine. The method further includes: in response to an indication that misfire occurred within the cylinder, transitioning lifting of the valve from one of a low lift state and a high lift state to the other one of the low lift state and the high lift state. The method further includes: selectively indicating that a fault is present in a variable valve lift (VVL) mechanism of the cylinder based on whether occurrence of misfire within the cylinder is indicated after the transition to the other one of the low lift state and the high lift state.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine combusts an air/fuel mixture within cylinders to generate drive torque. Air flows into a cylinder through an intake valve. Exhaust flows out of a cylinder through an exhaust valve. Each cylinder may include one or more intake valves and one or more exhaust valves.

A variable valve lift (VVL) mechanism enables operation of an associated valve (e.g., an intake valve or an exhaust valve) in two discrete lift states: a high lift state and a low lift state. During operation in the low lift state, the VVL mechanism opens the valve a first distance. The VVL mechanism opens the valve a second distance during operation in the high lift state, and the second distance is greater than the first distance.

A cylinder with a faulty VVL mechanism will have different combustion characteristics (e.g., burn rate) than other cylinders. For example, a cylinder with a faulty VVL mechanism may exhibit a greater level of misfire than one or more other cylinders. The present disclosure describes systems and methods for detecting and indicating whether a fault is present in a VVL mechanism of a cylinder based on engine misfire.

Figure 1A:
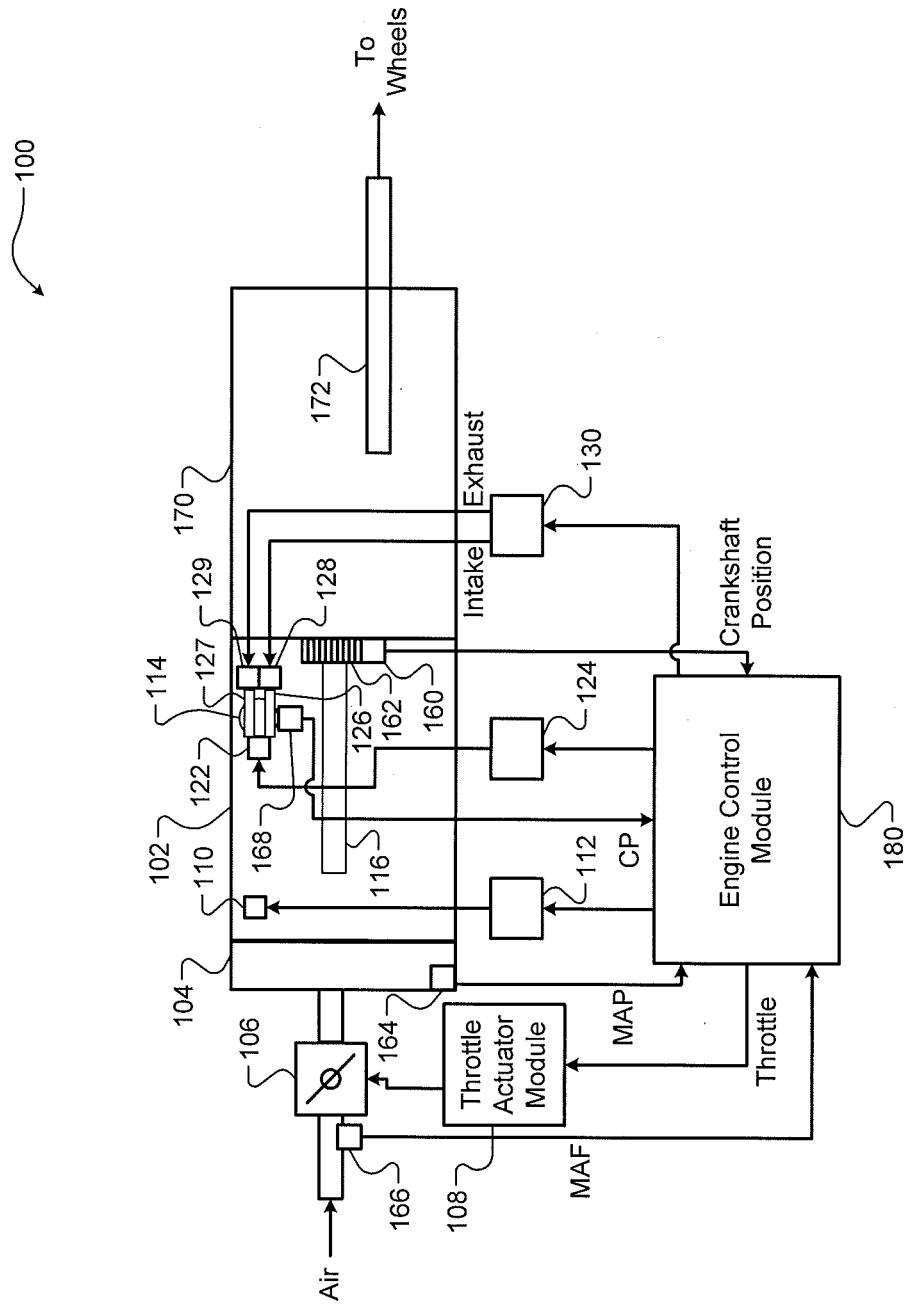
FIG. 1A is a functional block diagram of an example vehicle system according to the present disclosure.

Referring now to FIG. 1A, a functional block diagram of an example vehicle system 100 is presented. An engine 102 generates torque for a vehicle. Air is drawn into the engine 102 through an intake manifold 104. Airflow into the intake manifold 104 may be varied by a throttle valve 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injectors.

A cylinder 114 includes a piston (not shown) that is coupled to a crankshaft 116. Although the engine 102 is depicted as including only the cylinder 114, the engine 102 may include more than one cylinder. The fuel injectors may inject fuel directly into the cylinders or at another suitable location. One combustion cycle of the cylinder 114 may include four strokes: an intake stroke, a compression stroke, an expansion stroke, and an exhaust stroke. During one revolution of the crankshaft 116 (i.e., 360 degrees of crankshaft rotation), two of the four strokes can occur. One engine cycle includes each of the cylinders undergoing one combustion cycle and occurs over two revolutions of the crankshaft 116 (i.e., 720 degrees of crankshaft rotation).

Figure 1B:
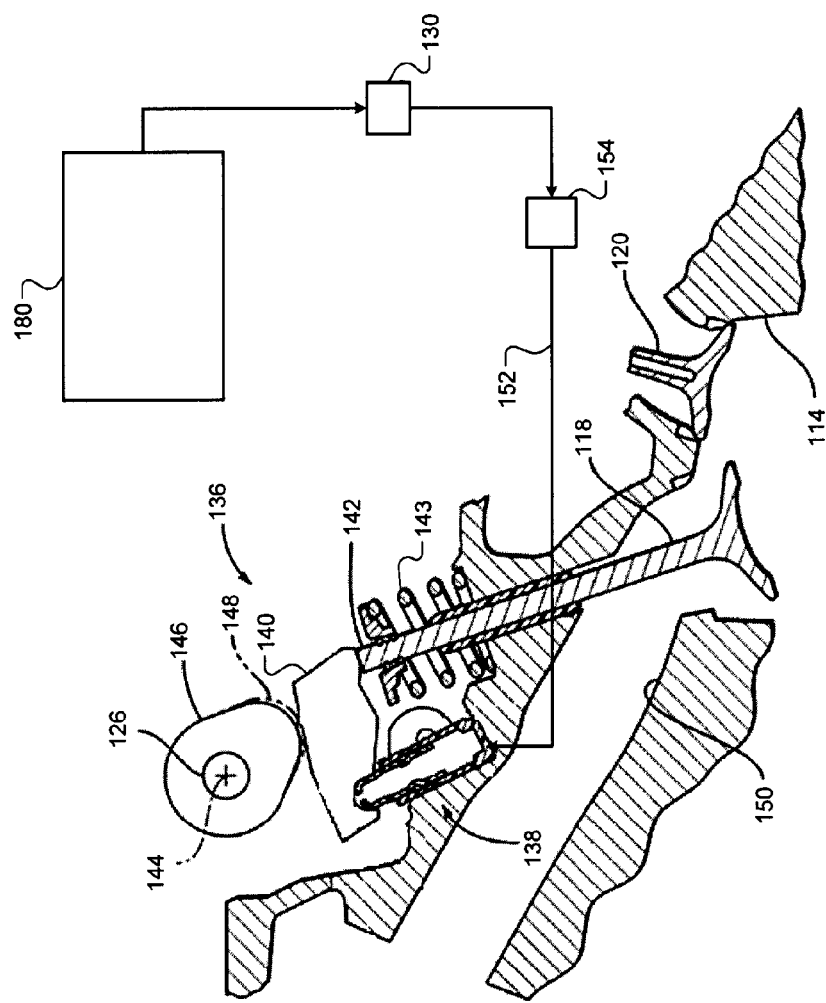
FIG. 1B is a diagram of an example variable valve lift (VVL) system according to the present disclosure.

Referring also to FIG. 1B, during the intake stroke, the piston is lowered to a bottom most position, and air and fuel may be provided to the cylinder 114. The bottom most position may be referred to as a bottom dead center (BDC) position. During the intake stroke, air enters the cylinder 114 through one or more intake valves associated with the cylinder 114, such as intake valve 118. One or more exhaust valves, such as exhaust valve 120, are also associated with the cylinder 114. While only the intake valve 118 and the exhaust valve 120 are shown and discussed, the cylinder 114 may include one or more additional intake valves and/or one or more additional exhaust valves.

During the compression stroke, the crankshaft 116 drives the piston toward a top most position. The top most position may be referred to as a top dead center (TDC) position. The intake valve 118 and the exhaust valve 120 are both closed during the compression stroke, and the piston compresses the contents of the cylinder 114. A spark plug 122 may ignite the air/fuel mixture. A spark actuator module 124 controls the spark plugs of the engine 102. The spark plugs may be omitted in various types of engines.

Combustion of the air/fuel mixture drives the piston back toward the BDC position during the expansion stroke. The piston drives the crankshaft 116. The rotational force (i.e., torque) on the crankshaft 116 from combustion of the air/fuel mixture may be a source of compressive force for a compression stroke of a combustion cycle of a next cylinder in a predetermined firing order of the cylinders.

Exhaust resulting from the combustion of the air/fuel mixture is expelled from the cylinder 114 during the exhaust stroke. The exhaust is expelled from the cylinder 114 via the exhaust valve 120. While the engine 102 is described as a four-stroke, spark ignition engine, the engine 102 may be another suitable type of engine. One or more electric motors may be provided with the engine 102.

The timing of opening and closing of the intake valve 118 is regulated by an intake camshaft 126. An intake camshaft, such as the intake camshaft 126, may be provided for each bank of cylinders of the engine 102. The timing of opening and closing of the exhaust valve 120 is regulated by an exhaust camshaft 127. An exhaust camshaft (not shown) may be provided for each bank of cylinders of the engine 102. Rotation of the intake camshaft(s) and the exhaust camshaft(s) is generally driven by rotation of the crankshaft 116, such as by a belt or a chain.

A cam phaser regulates rotation of an associated camshaft. For example only, intake cam phaser 128 regulates rotation of the intake camshaft 126. The intake cam phaser 128 may adjust the rotation of the intake camshaft 126, for example, with respect to rotation of the crankshaft 116, with respect to a position of the piston, with respect to another camshaft, etc. For example only, the intake cam phaser 128 may retard or advance rotation of the intake camshaft 126, thereby changing the opening and closing timing of the intake valve 118. An exhaust cam phaser 129 regulates rotation of the exhaust camshaft 127. Adjusting rotation of a camshaft with respect to rotation of the crankshaft 116 may be referred to as camshaft phasing.

A valve actuator module 130 controls the intake cam phaser 128. The valve actuator module 130 or another actuator module may control operation of the exhaust cam phaser 129. A cam phaser may be electrically or hydraulically actuated. Hydraulically actuated cam phasers operate based on pressure of a hydraulic fluid (e.g., oil) supplied to the cam phaser. Electrically actuated cam phasers operate using electrical power.

A variable valve lift (VVL) mechanism 136 (FIG. 1B) is associated with the intake valve 118. For example only, the VVL mechanism 136 may include a switchable roller finger follower (SRFF) mechanism. While the VVL mechanism 136 is shown and will be discussed as a SRFF, the VVL mechanism 136 may include other types of valve lift mechanisms that enable an associated valve to be lifted to two or more discrete lift positions. Further, while the VVL mechanism 136 is shown and discussed as being associated with the intake valve 118, another VVL mechanism may be implemented similarly for the exhaust valve 120. For example only, one VVL mechanism may be provided for each valve of each cylinder.

The VVL mechanism 136 includes a lift adjuster 138 and a cam follower 140. The cam follower 140 is in mechanical contact with a valve stem 142 of the intake valve 118. A biasing device 143 biases the valve stem 142 into contact with the cam follower 140. The cam follower 140 is also in mechanical contact with the intake camshaft 126 and the lift adjuster 138.

The intake camshaft 126 rotates about a camshaft axis 144. The intake camshaft 126 includes a plurality of cam lobes including low lift cam lobes and high lift cam lobes, such as low lift cam lobe 146 and high lift cam lobe 148. For example only, the intake camshaft 126 may include one low lift cam lobe and one high lift cam lobe for each intake valve of each cylinder. The exhaust camshaft 127 may include one low lift cam lobe and one high lift cam lobe for each exhaust valve of each cylinder. While only lifting of the intake valve 118 will be discussed, the present application is also applicable to exhaust valves and other intake valves.

The low and high lift cam lobes 146 and 148 rotate with the intake camshaft 126. Air may flow into the cylinder 114 through an inlet passage 150 when the intake valve 118 is open. Airflow into the cylinder 114 through the inlet passage 150 is blocked when the intake valve 118 is closed. The intake valve 118 is selectively opened and closed via the intake camshaft 126. More specifically, one of the low lift cam lobe 146 and the high lift cam lobe 148 opens and closes the intake valve 118 during a given combustion cycle.

A cam lobe contacting the cam follower 140 applies a force to the cam follower 140 in the direction of the valve stem 142 and the lift adjuster 138. The cam follower 140 may also be referred to as a rocker arm. The lift adjuster 138 is collapsible to allow the intake valve 118 to be opened to two discrete positions, a low lift position and high lift position. Pressure of a hydraulic fluid 152 may be controlled to control which one of the low lift cam lobe 146 and the high lift cam lobe 148 opens the intake valve 118 during a given combustion cycle.

During operation of the intake valve 118 in the low lift state, the low lift cam lobe 146 causes the VVL mechanism 136 to pivot in accordance with the geometry of the low lift cam lobe 146. The pivoting of the VVL mechanism 136 caused by the low lift cam lobe 146 opens the intake valve 118 a first predetermined amount or distance. During operation in the high lift state, the high lift cam lobe 148 causes the VVL mechanism 136 to pivot in accordance with the geometry of the high lift cam lobe 148. The pivoting of the VVL mechanism 136 caused by the high lift cam lobe 148 opens the intake valve 118 a second predetermined amount or distance. The second predetermined amount or distance is greater than the first predetermined amount or distance.

A fluid control valve 154 regulates the pressure of the hydraulic fluid 152. The valve actuator module 130 or another actuator module controls the fluid control valve 154 to control the pressure of the hydraulic fluid 152. The fluid control valve 154 may also be referred to as an oil control valve (OCV).

A crankshaft position sensor 160 (FIG. 1A) monitors an N-toothed wheel 162 and generates a crankshaft position signal based on rotation of the N-toothed wheel 162. For example only, the crankshaft position sensor 160 may include a variable reluctance (VR) sensor or another suitable type of crankshaft position sensor. The N-toothed wheel 162 rotates with the crankshaft 116.

A manifold absolute pressure (MAP) sensor 164 monitors pressure within the intake manifold 104 and generates a MAP signal based on the pressure. In various implementations, vacuum within the intake manifold 104 may be measured, where the vacuum is measured relative to ambient pressure. A mass air flowrate (MAF) sensor 166 monitors mass flowrate of air flowing through the throttle valve 106 and generates a MAF signal based on the mass flowrate.

A cylinder pressure sensor 168 measures pressure within the cylinder 114 and generates a cylinder pressure signal based on the pressure within the cylinder 114. A cylinder pressure sensor may be provided for each cylinder of the engine 102. In various implementations, cylinder pressure sensors may be omitted. One or more other sensors may also be implemented.

The engine 102 transfers torque to a transmission 170. The transmission 170 may include a manual type transmission, an automatic type transmission, an auto-manual type transmission, or another suitable type of transmission. The transmission 170 may transfer torque to one or more wheels (not shown) via a transmission output shaft 172 and a driveline (not shown).

An engine control module (ECM) 180 controls operation of the engine 102. More specifically, the ECM 180 controls the throttle valve 106 via the throttle actuator module 108 and controls the fuel injectors via the fuel actuator module 112. The ECM 180 controls the spark plugs via the spark actuator module 124. The ECM 180 controls phasing of the intake and exhaust valves via the valve actuator module 130. The ECM 180 may also control lifting of the intake and exhaust valve via the valve actuator module 130.

The ECM 180 selectively learns the distance between each pair of consecutive teeth of the N-toothed wheel 162. Based on the learned distances and the crankshaft position signal, the ECM 180 generates a second crankshaft position signal. The ECM 180 generates an engine speed signal based on the second crankshaft position signal. The engine speed signal at a given crankshaft position indicates instantaneous engine speed at the crankshaft position.

The ECM 180 may determine an indicated work of a combustion cycle of the cylinder 114 based on squares of two or more instantaneous engine speeds at predetermined crankshaft positions of the combustion cycle, respectively. The ECM 180 may determine an indicated mean effective pressure (IMEP) for the combustion cycle of the cylinder 114 based on the indicated work and a displacement volume of the engine 102. The ECM 180 determines an IMEP for each combustion cycle of each cylinder of the engine 102. In various implementations, the ECM 180 may determine the IMEPs based on cylinder pressures measured by cylinder pressure sensors.

Based on the IMEPs, the ECM 180 may determine whether engine misfire occurred during the combustion cycle and perform one or more other actions, such as adjusting one or more engine operating parameters. For example only, engine operating parameters may include camshaft phasing based on a crankshaft angle at which 50% of the fuel will be burnt (CA50) within the cylinder 114, intake and/or exhaust valve lift state, ignition timing, and/or one or more other suitable engine operating parameters.

The ECM 180 may determine a coefficient of variation (COV) for the cylinder 114 using the IMEP and a predetermined number of previous IMEPs determined for previous combustion cycles of the cylinder 114, respectively. The ECM 180 may determine a COV for each cylinder. The ECM 180 determines and indicates whether misfire occurred within a cylinder based on the cylinder's COV.

Figure 2:
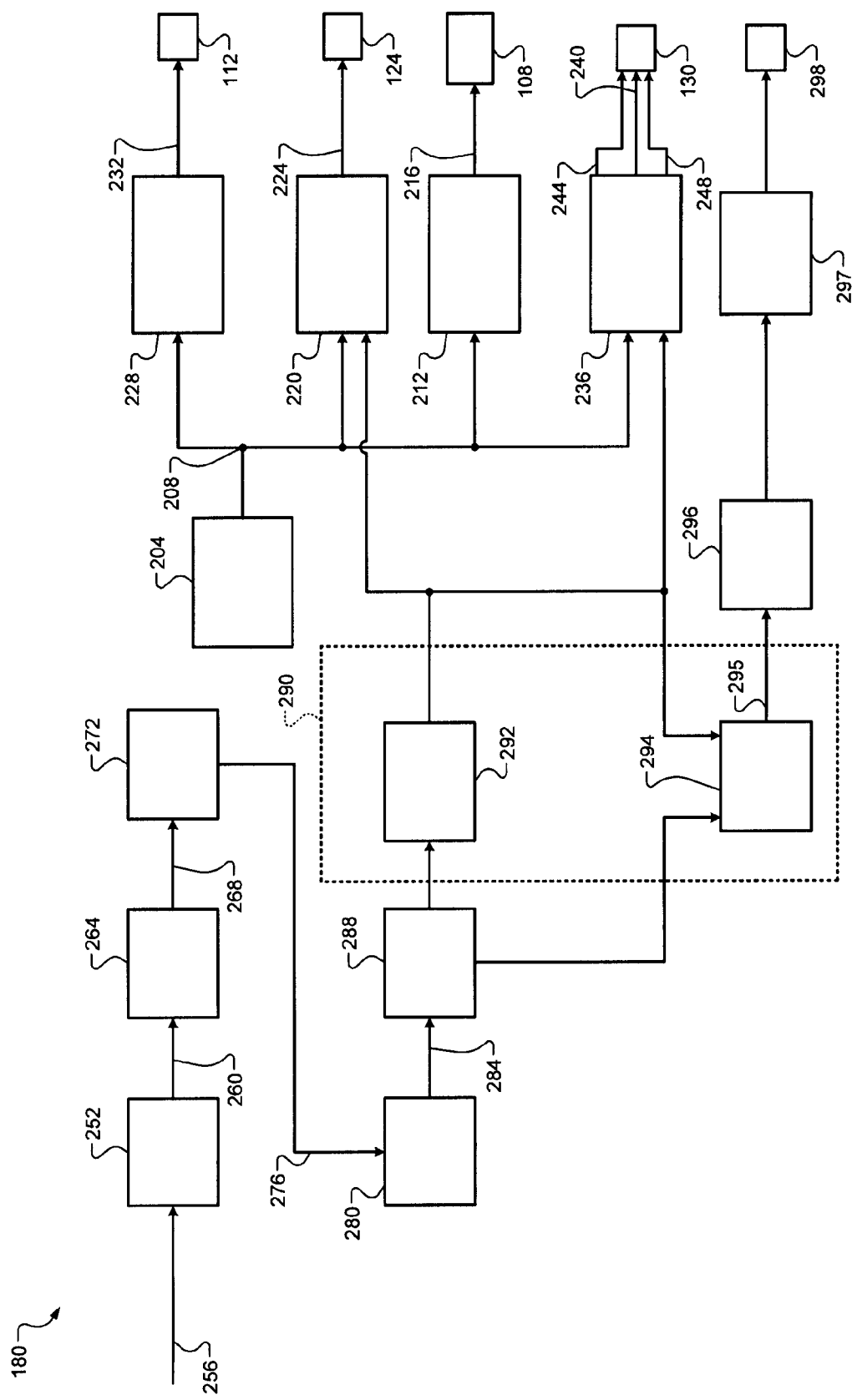
FIG. 2 is a functional block diagram of an example engine control system according to the present disclosure.

Referring now to FIG. 2, a functional block diagram of an engine control system including an example portion of the ECM 180 is presented. A driver torque module 204 may determine a driver torque request 208 based on one or more driver inputs, such as an accelerator pedal position, a brake pedal position, a cruise control input, and/or one or more other suitable driver inputs. One or more engine operating parameters may be controlled based on the driver torque request 208 and/or one or more other torque requests.

For example, a throttle control module 212 may determine a desired throttle opening 216 based on the driver torque request 208. The throttle actuator module 108 may adjust opening of the throttle valve 106 based on the desired throttle opening 216. A spark control module 220 may determine a desired spark timing 224 based on the driver torque request 208. The spark actuator module 124 may generate spark based on the desired spark timing 224.

A fuel control module 228 may determine one or more desired fueling parameters 232 based on the driver torque request 208. For example, the desired fueling parameters 232 may include fuel injection timing and amount. The fuel actuator module 112 may actuate the fuel injectors to inject fuel based on the desired fueling parameters 232.

A valve control module 236 may determine a desired lift state 240, a desired intake phase angle 244, and a desired exhaust phase angle 248 based on the driver torque request 208. The desired lift state 240 may be one of the high lift state and the low lift state. The valve actuator module 130 controls operation of the valves in the high lift state or the low lift state at a given time based on the desired lift state 240. The valve actuator module 130 may control intake and exhaust camshaft phasing based on the desired intake and exhaust phase angles 244 and 248, respectively.

A filter module 252 generates estimates of the (instantaneous) crankshaft position, the (instantaneous) engine speed, and the crankshaft acceleration based on a crankshaft position 256 generated using the crankshaft position sensor 160. The filter module 252 generates a crankshaft position (not specifically shown), an engine speed 260, and an acceleration (not specifically shown) to indicate the estimates, respectively. The filter module 252 may generate the estimates using, for example, a Kalman based filter, a Chebyshev based filter, a Butterworth type II based filter, or another suitable type of filter.

An IMEP module 264 determines an IMEP 268 for the combustion cycle of the cylinder 114. The IMEP module 264 may determine the IMEP 268 for a combustion cycle based on an indicated work for the combustion cycle. The IMEP module 264 determines the IMEP 268 for the combustion cycle further based on a displacement volume of the engine 102. The IMEP module 264 may determine the indicated work for the combustion cycle of the cylinder 114 based on squares of two or more of values of the engine speed 260 at predetermined crankshaft positions of the combustion cycle, respectively. The IMEP module 264 determines the indicated work and the IMEP 268 for each combustion cycle of each of cylinder of the engine 102. In various implementations, the IMEP module 264 may determine the indicated work and/or the IMEP 268 based on cylinder pressures measured using cylinder pressure sensors.

A coefficient of variation (COV) module 272 determines a COV 276 for the cylinder 114 based on a predetermined number of values of the IMEP 268 determined for a predetermined number of previous (e.g., most recent) combustion cycles of the cylinder 114, respectively. The COV module 272 may, for example, set the COV 276 equal to a standard deviation of the predetermined number of values of the IMEP 268 divided by an average of the values of the IMEP 268. The COV module 272 determines a COV for each cylinder based on the cylinders' IMEP values, respectively.

A misfire indication module 280 indicates whether misfire occurred within the cylinder 114 based on the COV 276 of the cylinder 114. The misfire indication module 280 generates misfire data 284 indicating whether misfire occurred within the cylinder 114. The misfire indication module 280 also determines whether misfire occurred in each other cylinder based on each cylinder's respective COV and generates the misfire data 284 accordingly. For example, the misfire indication module 280 may determine and indicate that misfire occurred within a cylinder when the cylinder's COV is greater than a predetermined value. For example only, the misfire indication module 280 may indicate that misfire occurred within a cylinder when the cylinder's COV is 18 percent (%) or more.

A cylinder with a faulty VVL mechanism will have different combustion characteristics (e.g., burn rate) than other cylinders. For example, a cylinder with a faulty VVL mechanism may exhibit a greater level of misfire than one or more other cylinders. A cylinder with a faulty VVL mechanism may, for example, exhibit misfire more frequently than cylinders with reliable VVL mechanisms, a cylinder with a faulty VVL mechanism may exhibit more observable misfire (e.g., a greater COV) than cylinders with reliable VVL mechanisms.

When a VVL mechanism is faulty, the associated valve will be stuck in operation in one of the high lift state and the low lift state, regardless of whether the desired lift state 240 is the high lift state or the low lift state. For example, when the VVL mechanism is faulty, the associated valve may be stuck operating in the high lift state both when the desired lift state 240 is the high lift state and when the desired lift state 240 is the low lift state.

A storage module 288 stores the misfire data 284 for the cylinders. For example, the storage module 288 may track a number of times that the misfire indication module 280 indicated that misfire occurred for each cylinder over a predetermined period or a predetermined number of engine cycles. The storage module 288 may also store the value of the COV 276 for each cylinder.

A fault detection module 290 may include a transition command module 292 and a fault indication module 294. When one or more enabling conditions are satisfied, the transition command module 292 commands the valve control module 236 to transition the desired lift state 240 to the other one of the lift states. For example only, the transition command module 292 may command the valve control module 236 to perform the transition when the COV of a cylinder is greater than the predetermined value, the COV of a cylinder is greater than the COF of one or more other cylinders by at least a predetermined amount, and/or when one or more misfires are detected by the misfire indication module 280.

When the desired lift state 240 is set to the high lift state, the valve control module 236 transitions the desired lift state 240 to the low lift state in response to the command. When the desired lift state 240 is set to the low lift state, the valve control module 236 transitions the desired lift state to the high lift state in response to the command.

When the desired lift state 240 is set to the low lift state and the valve control module 236 transitions the desired lift state 240 to the high lift state in response to the command, the transition command module 292 may also command the spark control module 220 to adjust spark timing and command the valve control module 236 to adjust intake and/or exhaust cam phasing. The transition command module 292 may, for example, command the spark control module 220 to adjust the spark timing to a predetermined timing by adjusting the desired spark timing 224 by a predetermined amount each combustion cycle. When the desired lift state 240 is set to the low lift state initially, the transition command module 292 may also command the valve control module 236 to adjust intake and/or exhaust cam phasing to achieve predetermined phase angles by adjusting the desired intake and exhaust phase angles 244 and 248, respectively, by a predetermined amount each combustion cycle. The predetermined timing for the spark timing and the predetermined phase angles for intake and/or exhaust cam phasing may be predetermined, calibrated values that make misfire more observable during operation in the high lift state.

When the desired lift state 240 is set to the high lift state when the command is received, adjustments to the spark timing and/or the intake and exhaust phase angles may not be performed. Misfire may be readily observable during operation in the low lift state (that is, after a transition from the high lift state to the low lift state) without adjustments to spark timing and/or intake and/or exhaust cam phasing.

In response to the transition to the other one of the lift states, the fault indication module 294 monitors whether misfire occurs in one or more cylinders. The fault indication module 294 may wait a predetermined period or a predetermined number of engine cycles after the transition to the other one of the lift states before performing the monitoring.

The fault indication module 294 indicates whether a fault is present in a VVL mechanism of the cylinder based on whether a cylinder that experienced misfire before the transition to the other one of the lift states continues to experience misfire after the transition. For example, the fault indication module 294 may indicate that a fault is present in a VVL mechanism when a cylinder that experienced misfire before the transition does not experience misfire after the transition. When the cylinder continues to experience misfire after the transition, the fault indication module 294 may indicate that no fault is present in a VVL mechanism.

In various implementations, a second transition in the desired lift state 240 may be performed when the cylinder does not exhibit misfire after the transition to the other one of the lift states. In other words, the desired lift state 240 may be transitioned back to the initial one of the lift states. The second transition may be performed, for example, to verify the presence of a fault in the VVL mechanism by verifying that the cylinder experiences misfire during operation one of the lift states and does not experience misfire during operation in the other one of the lift states.

The fault indication module 294 may indicate whether a fault is present in a VVL mechanism of the cylinder based on whether the cylinder experiences misfire after the second transition. For example, the fault indication module 294 may indicate that a fault is present in a VVL mechanism of the cylinder when the cylinder experiences misfire after the second transition. When the cylinder does not experience misfire after the second transition, the fault indication module 294 may indicate that no fault is present in a VVL mechanism. The fault indication module 294 may again wait a predetermined period or a predetermined number of engine cycles after the second transition to the other one of the lift states before performing the monitoring.

The fault indication module 294 indicates whether a fault is present in a VVL mechanism of the cylinder via a VVL mechanism fault indicator 295. For example, the fault indication module 294 may set the VVL mechanism fault indicator 295 to an active state in memory 296 when a fault is present in a VVL mechanism of the cylinder. The fault indication module 294 may set the VVL mechanism fault indicator 295 to an inactive state when a fault is not present in a VVL mechanism. For example, the VVL mechanism fault indicator 295 may be a predetermined diagnostic trouble code (DTC) associated with a fault in a VVL mechanism of the cylinder. The fault in the VVL mechanism may be, for example, a broken rocker arm.

The fault indication module 294 may also generate the VVL mechanism fault indicator 295 that indicates whether the faulty VVL mechanism is stuck in operation in the high lift state or the low lift state. When the cylinder stops experiencing misfire after the transition and/or experiences misfire after the second transition, the fault indication module 294 may indicate that the VVL mechanism is stuck operating the associated valve in the initial lift state. For example, when the desired lift state 240 was first transitioned from the low lift state to the high lift state and second transitioned from the high lift state to the low lift state, the fault indication module 294 may indicate that the VVL mechanism is stuck in the low lift state when the cylinder stops experiencing misfire after the first transition to the high lift state and/or the cylinder experiencing misfire after the second transition to the low lift state.

A monitoring module 297 may monitor generation of the VVL mechanism fault indicator 295 and/or one or more other fault indicators. In response to generation of the VVL mechanism fault indicator 295, the monitoring module 297 may, for example, illuminate a malfunction indicator lamp (MIL) 298. Based on the VVL mechanism fault indicator 295, a vehicle servicer can identify and replace the VVL mechanism that includes the fault and that caused the misfire.

One or more other remedial actions may be taken in response to generation of the VVL mechanism fault indicator 295. For example only, the valve control module 236 may limit setting of the desired lift state 240 to the one of the lift states that the VVL mechanism is stuck. For example, when the fault indication module 294 indicates that the VVL mechanism is stuck in the low lift state, the valve control module 236 may set the desired lift state 240 only to the low lift state and refrain from setting the desired lift state 240 to the high lift state.

Figure 3:
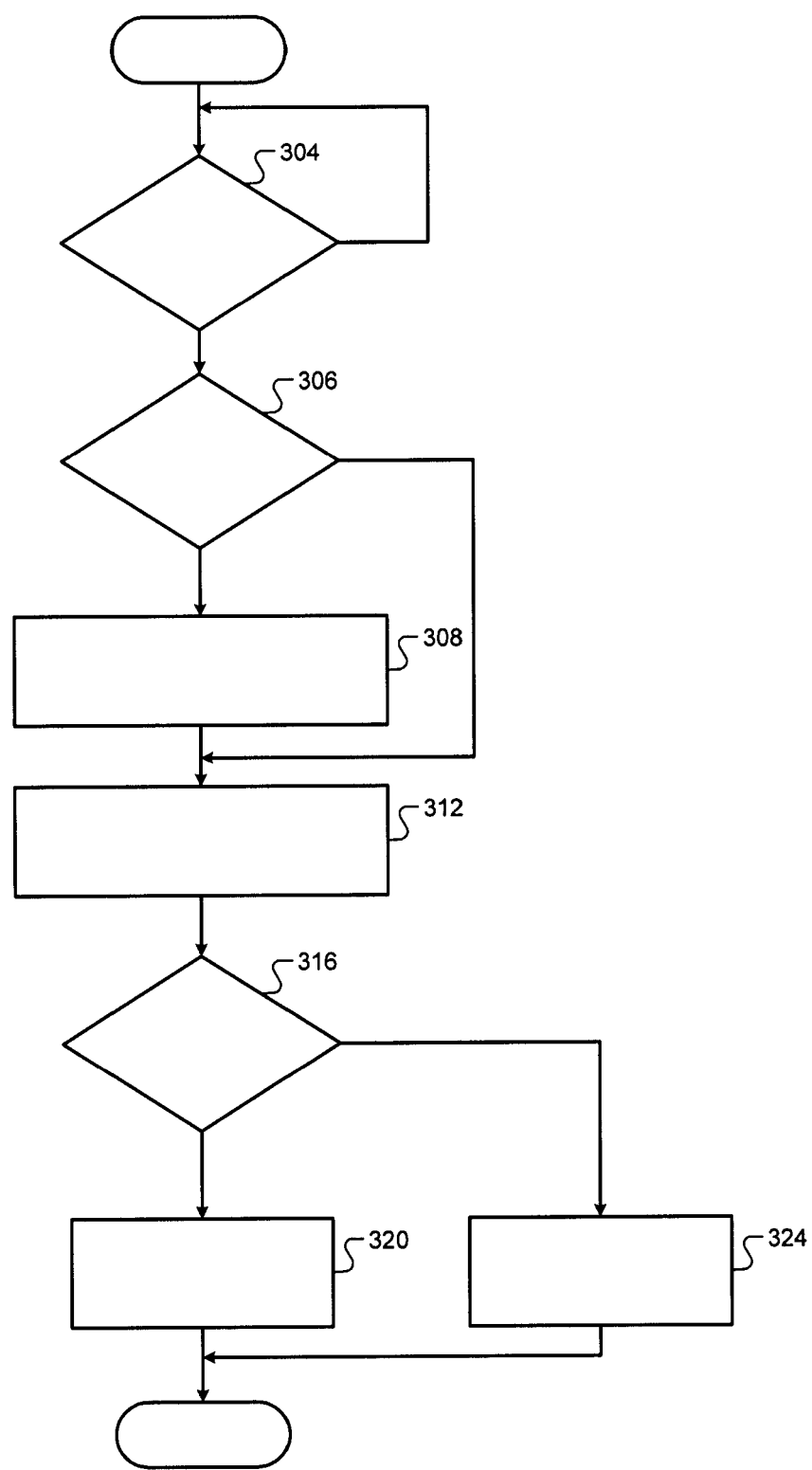
FIG. 3 is a flowchart depicting an example method of determining and indicating whether a fault is present in a VVL mechanism of a cylinder according to the present disclosure.

Referring now to FIG. 3, a flowchart depicting an example method of determining and indicating whether a fault is present in a VVL mechanism of a cylinder is presented. Control may begin with 304 where control determines whether misfire occurred in a cylinder. Control may additionally or alternatively determine whether the COV of a cylinder is greater than the predetermined value and/or whether the COV of a cylinder is greater than the COV of one or more other cylinders by at least the predetermined amount at 304. If true, control may continue with 306. If false, control may remain at 304.

At 306, control may determine whether the lift state is currently the low lift state. If false, control may selectively adjust the spark timing, the intake cam phase angle, and/or the exhaust phase cam angle at 308 and proceed with 312. If true, control may transfer to 312.

At 312, control transitions the desired lift state 240 to the other one of the lift states. For example, if the desired lift state 240 is in the low lift state, control transitions the desired lift state 240 to the high lift state, and vice versa. At 316, control may determine whether the cylinder (that experienced misfire before the transition) is still experiencing misfire. If false, control may indicate that a fault is present in a VVL mechanism of the cylinder at 320, and control may end. Control may also indicate that the VVL mechanism is stuck in operation in the one of lift states from before the transition at 320. For example, if the desired lift state 240 was in the low lift state before the transition, control may indicate that the VVL mechanism is stuck in operation in the low lift state at 320. If true at 316, control may indicate that no fault is present in the VVL mechanisms of the engine 102 at 324, and control may end.

One or more remedial actions may be taken when a fault is present in a VVL mechanism of the cylinder. For example, control may limit the desired lift state 240 to the one of the lift states in which the VVL mechanism is stuck and prevent the desired lift state 240 from being transitioned to the other one of the lift states. Additionally or alternatively, control may illuminate the MIL 298.

Figure 4:
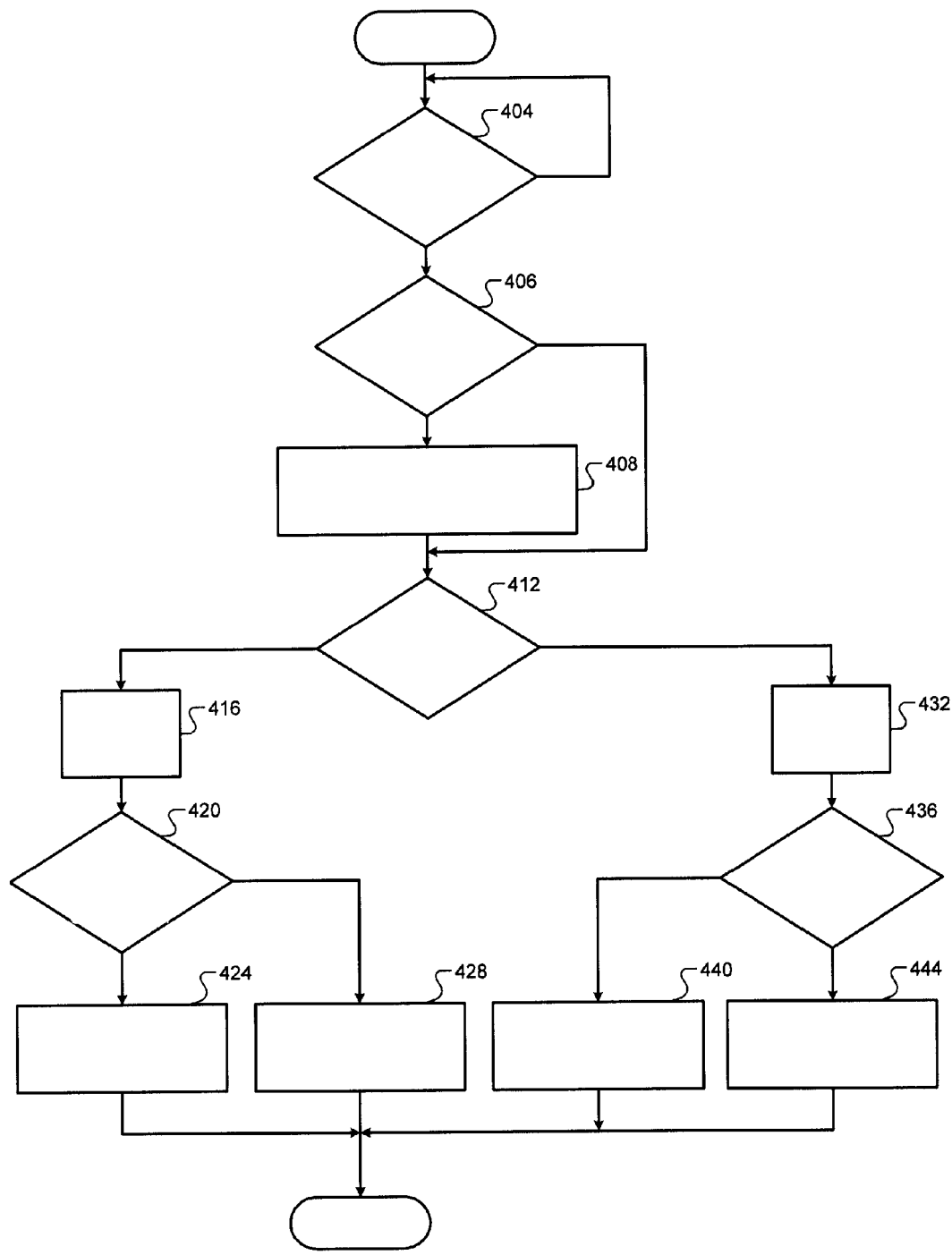
FIG. 4 is a flowchart depicting an example method of determining and indicating whether a fault is present in a VVL mechanism of a cylinder according to the present disclosure.

Referring now to FIG. 4, a flowchart depicting an example method of determining and indicating whether a fault is present in a VVL mechanism of a cylinder is presented. Control may begin with 404 where control may determine whether one or more enabling conditions for determining whether a fault is present in a VVL mechanism of a cylinder are satisfied. If true, control may continue with 406. If false, control may remain at 404.

At 406, control may determine whether the lift state is currently the low lift state. If false, control may selectively adjust the spark timing, the intake cam phase angle, and/or the exhaust phase cam angle at 408, and control may proceed with 412. If true, control may transfer to 412.

Control may determine whether one or more cylinders have experienced a greater level of misfire than one or more other cylinders at 412. For example, control may determine whether a number of misfires that have occurred within a cylinder during a predetermined period or a predetermined number of engine cycles is greater than a number of misfires that have occurred within one or more other cylinders during the period or number of engine cycles at 412. Control may require the number of misfires to be greater than the number of misfires in the one or more other cylinders by at least a predetermined amount. If true, control may continue with 416-428. If false, control may continue with 432-444, which are discussed further below.

Control transitions the desired lift state 240 to the other one of the lift states at 416. For example, if the desired lift state 240 is in the low lift state, control transitions the desired lift state 240 to the high lift state, and vice versa. At 420, control may determine whether the one or more cylinders (that experienced a greater level of misfire than one or more other cylinders before the transition) is/are still experiencing a greater level of misfire than one or more other cylinders. If false, control may indicate that a fault is present in a VVL mechanism of the cylinder at 428, and control may end. Control may also indicate that the VVL mechanism is stuck in operation in the one of lift states from before the transition at 428. For example, if the desired lift state 240 was in the low lift state before the transition, control may indicate that the VVL mechanism is stuck in operation in the low lift state at 428. If true at 420, control may indicate that no fault is present in the VVL mechanisms of the cylinder at 424, and control may end.

As stated above, when 412 is false, control may continue with 432-444. At 432, control transitions the desired lift state 240 to the other one of the lift states. For example, if the desired lift state 240 is in the low lift state, control transitions the desired lift state 240 to the high lift state, and vice versa.

At 436, control may determine whether one or more cylinders have, after the transition, experienced a greater level of misfire than one or more other cylinders while not experiencing a greater level of misfire before the transition. For example, control may determine whether a number of misfires that have occurred within a cylinder during a predetermined period or a predetermined number of engine cycles is greater than a number of misfires that have occurred within one or more other cylinders during the period or number of engine cycles at 412. Control may require the number of misfires to be greater than the number of misfires in the one or more other cylinders by at least a predetermined amount. If true, control may indicate that a fault is present in a VVL mechanism of the cylinder at 440, and control may end. Control may also indicate that the VVL mechanism is stuck in operation in the one of lift states from before the transition at 440. For example, if the desired lift state 240 was in the low lift state before the transition, control may indicate that the VVL mechanism is stuck in operation in the low lift state at 440. If true at 436, control may indicate that no fault is present in the VVL mechanisms of the engine 102 at 444, and control may end.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system for a vehicle, comprising:
   a first electronic circuit that selectively indicates that a coefficient of variation (COV) of indicated mean effective pressure (IMEP) of a cylinder of an engine is greater than a predetermined value;
   a second electronic circuit that controls lifting of a valve of the cylinder of the engine and that, in response to the first electronic circuit indicating that the COV of IMEP of the cylinder is greater than the predetermined value, transitions lifting of the valve from one of a low lift state and a high lift state to the other one of the low lift state and the high lift state; and
   a third electronic circuit that selectively indicates that a fault is present in a variable valve lift (VVL) mechanism of the cylinder based on whether the first electronic circuit indicates that the COV of IMEP of the cylinder is greater than the predetermined value after the transition to the other one of the low lift state and the high lift state.

2. The system of claim 1 wherein the third electronic circuit indicates that the fault is present in the VVL mechanism when the first electronic circuit does not indicate that the COV of IMEP of the cylinder is greater than the predetermined value after the transition to the other one of the low lift state and the high lift state.

3. The system of claim 2 wherein the third electronic circuit further indicates that the valve is stuck operating in the one of the low lift state and the high lift state when the first electronic circuit does not indicate that the COV of IMEP of the cylinder is greater than the predetermined value after the transition to the other one of the low lift state and the high lift state.

4. The system of claim 2 wherein the third electronic circuit further indicates that the fault is associated with the cylinder when the first electronic circuit does not indicate that the COV of IMEP of the cylinder is greater than the predetermined value after the transition to the other one of the low lift state and the high lift state.

5. The system of claim 2 wherein the third electronic circuit indicates that the fault is not present in the VVL mechanism when the first electronic circuit indicates that the COV of IMEP of the cylinder is greater than the predetermined value after the transition to the other one of the low lift state and the high lift state.

6. The system of claim 1 wherein the third electronic circuit sets a predetermined diagnostic trouble code (DTC) in memory when the fault is present in the VVL mechanism.

7. The system of claim 6 further comprising a fifth electronic circuit that monitors the memory and that illuminates a malfunction indicator lamp in response to the setting of the predetermined DTC.

8. The system of claim 1 further comprising a sixth electronic circuit that selectively adjusts spark timing of the cylinder in response to the first electronic circuit indicating that the COV of IMEP of the cylinder is greater than the predetermined value,
   wherein, in response to the first electronic circuit indicating that the COV of IMEP of the cylinder is greater than the predetermined value, the second electronic circuit further selectively adjusts at least one of intake camshaft phasing and exhaust camshaft phasing.

9. The system of claim 1 wherein the first, second, and third electronic circuits include or are a part of at least one of: an Application Specific Integrated Circuit (ASIC); a combinational logic circuit; a field programmable gate array (FPGA); and a processor, memory, and code.

10. A method for a vehicle, comprising:
   selectively indicating that a coefficient of variation (COV) of indicated mean effective pressure (IMEP) of a cylinder of an engine is greater than a predetermined value;
   controlling lifting of a valve of the cylinder of the engine;
   in response to an indication that the COV of IMEP of the cylinder is greater than the predetermined value, transitioning lifting of the valve from one of a low lift state and a high lift state to the other one of the low lift state and the high lift state; and
   selectively indicating that a fault is present in a variable valve lift (VVL) mechanism of the cylinder based on an indication of whether the COV of IMEP of the cylinder is greater than the predetermined value after the transition to the other one of the low lift state and the high lift state.

11. The method of claim 10 further comprising indicating that the fault is present in the VVL mechanism in response to an indication that the COV of IMEP of the cylinder is not greater than the predetermined value after the transition to the other one of the low lift state and the high lift state.

12. The method of claim 11 further comprising indicating that the valve is stuck operating in the one of the low lift state and the high lift state in response to the indication that the COV of IMEP of the cylinder is not greater than the predetermined value after the transition to the other one of the low lift state and the high lift state.

13. The method of claim 11 further comprising indicating that the fault is associated with the cylinder in response to the indication that the COV of IMEP of the cylinder is not greater than the predetermined value after the transition to the other one of the low lift state and the high lift state.

14. The method of claim 11 further comprising indicating that the fault is not present in the VVL mechanism in response to a second indication that the COV of IMEP of the cylinder is greater than the predetermined value after the transition to the other one of the low lift state and the high lift state.

15. The method of claim 10 further comprising setting a predetermined diagnostic trouble code (DTC) in memory when the fault is present in the VVL mechanism.

16. The method of claim 15 further comprising:
   monitoring the memory; and
   illuminating a malfunction indicator lamp in response to the setting of the predetermined DTC.

17. The method of claim 10 further comprising:
   selectively adjusting spark timing of the cylinder in response to the indication that the COV of IMEP of the cylinder is greater than the predetermined value; and
   selectively adjusting at least one of intake camshaft phasing and exhaust camshaft phasing in response to the indication that the COV of IMEP of the cylinder is greater than the predetermined value.

* * * * *

UNITED STATES PATENT AND TRADEMARK OFFICE
CERTIFICATE OF CORRECTION

PATENT NO. : 9,133,775 B2
APPLICATION NO. : 13/590369
DATED : September 15, 2015
INVENTOR(S) : Brian E. Betz et al.

Page 1 of 1

It is certified that error appears in the above-identified patent and that said Letters Patent is hereby corrected as shown below:

Title Page, Item [73] Assignee, insert the following:
--GM Global Technology Operations LLC, Detroit, MI (US)--

Signed and Sealed this
Fifth Day of July, 2016

Michelle K. Lee
*Director of the United States Patent and Trademark Office*